United States Patent [19]

Choi

[11] Patent Number: 5,448,371

[45] Date of Patent: Sep. 5, 1995

[54] VIDEO RECORDING/REPRODUCING APPARATUS CAPABLE OF READING A LABEL OF LASER DISK

[75] Inventor: Seung-lyeol Choi, Kyungki-do, Rep. of Korea

[73] Assignee: SamSung Electronics Co., Ltd., Kyungki-do, Rep. of Korea

[21] Appl. No.: 236,165

[22] Filed: May 2, 1994

Related U.S. Application Data

[63] Continuation of Ser. No. 824,786, Jan. 17, 1992, abandoned.

[30] Foreign Application Priority Data

Jan. 31, 1991 [KR] Rep. of Korea .................. 91-1866

[51] Int. Cl.$^6$ ..................... H04N 5/76; H04N 5/781
[52] U.S. Cl. ..................... 358/335; 358/342
[58] Field of Search .............. 358/342, 335, 310; 348/552; 360/33.1, 35.1, 60, 57; 380/3, 4, 5; H04N 5/76, 5/78, 5/781, 5/782, 5/783, 5/92, 9/79

[56] References Cited

U.S. PATENT DOCUMENTS

| | | | |
|---|---|---|---|
| 4,562,495 | 12/1985 | Bond et al. | 360/69 |
| 4,618,061 | 10/1986 | Rubenfeld | 360/60 |
| 4,775,901 | 10/1988 | Nakano | 360/60 |
| 4,823,210 | 4/1989 | Bond | 360/60 |
| 4,870,515 | 9/1989 | Stokes | 360/72.2 |
| 4,891,504 | 1/1990 | Gupta | 360/60 |
| 5,027,396 | 6/1991 | Platteter et al. | 360/60 |
| 5,097,348 | 3/1992 | Suetaka | 360/33.1 |
| 5,122,886 | 6/1992 | Tanaka | 358/342 |
| 5,124,808 | 6/1992 | Yokogawa | 358/342 |
| 5,177,619 | 1/1993 | Sato | 358/342 |
| 5,210,672 | 5/1993 | Ivers et al. | 369/59 |
| 5,265,163 | 11/1993 | Golding et al. | 380/4 |

OTHER PUBLICATIONS

The Abstract of JP #59-215076, Apr. 12, 1984.

Primary Examiner—Tommy P. Chin
Assistant Examiner—Thai Tran
Attorney, Agent, or Firm—Robert E. Bushnell

[57] ABSTRACT

A video recording/reproducing apparatus comprises a reader for reading out information recorded on a label formed on a non-recording portion of a video recording medium which has a recording portion where a program is recorded and a non-recording portion formed with the label. The label contains bibliographic information of the program recorded on said recording portion and/or information to limit access to the program. The apparatus also has a decoder for decoding the read out information, a character signal storing unit, a controller for controlling the whole apparatus, a video display for outputting a video signal, an on-screen display (OSD) for converting a character string into a signal suitable for the video display, and a video record/playback unit for reproducing the program recorded on the recording portion of the video recording medium and providing the reproduced program to the video display.

17 Claims, 4 Drawing Sheets

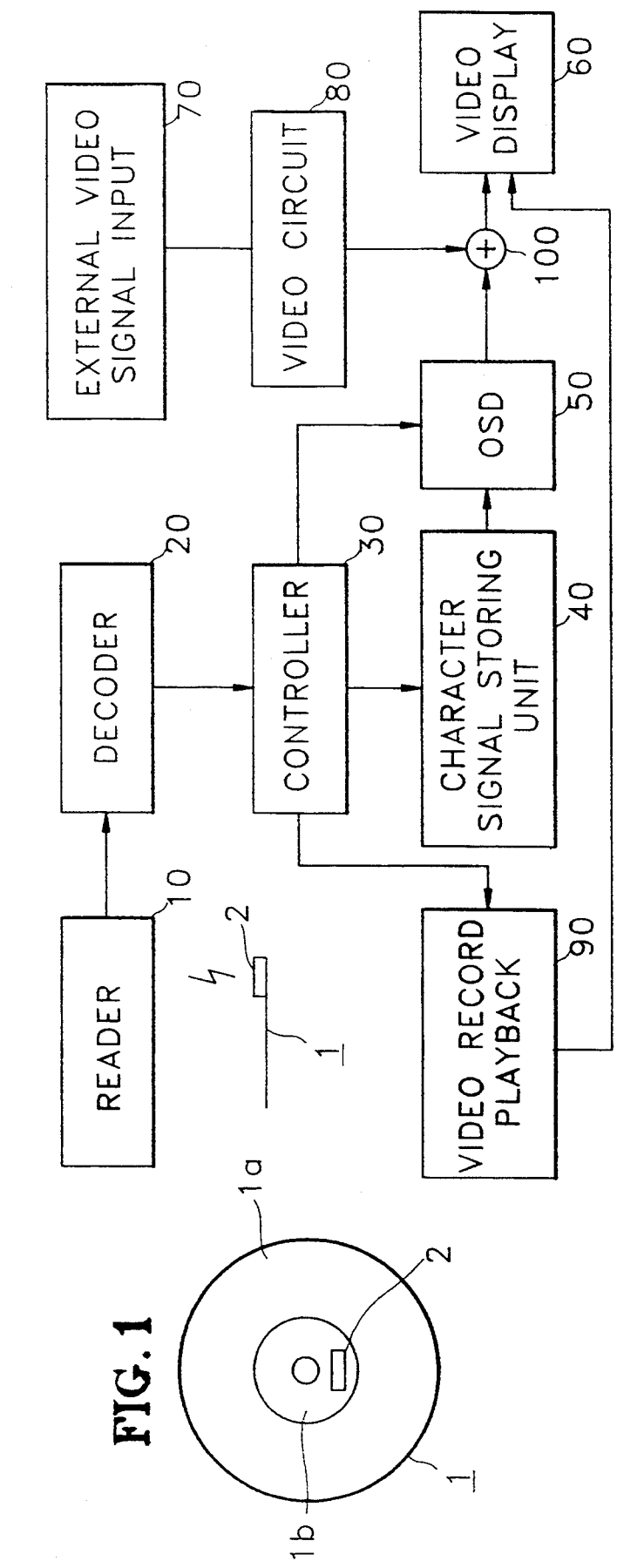

VIDEO RECORDING/REPRODUCING APPARATUS CAPABLE OF READING A LABEL OF LASER DISK

This is a continuation of application Ser. No. 07/824,786 filed Jan. 17, 1992 now abandoned.

BACKGROUND OF THE INVENTION

The present invention relates to a video recording/reproducing apparatus.

Recently, great developments have been attained in the field of video recording media which include the laser disk the video compact disk, (VCD) and the filmless photography (still video) as well as conventional magnetic tape and video cassettes. The advent of floppy disk type video recording media will occur in the near future.

Because of such developments in video recording media, the market for pre-recorded media is gradually spreading and consists of various programs such as movies or video games recorded on pre-packaged video recording media. Consequently, we can enjoy the various programs at home.

However, programs recorded on the programmed media range from programs which the whole family can enjoy, to programs unsuitable for children as well as programs which even some adults would find objectionable.

Besides, due to the wide spread availabilty of portable video recorders such as a camcorder, many ordinary people record programs which might include a program they do not want to be viewed freely.

Therefore, inventions employing a so-called security system for limiting a user's access to a video record/playback apparatus have been disclosed. However, they are inconvenient because they use either a hardware approach to block an operational panel, a deck or the power line of the apparatus, or a software approach requiring designation of a secret access number which renders the apparatus un-operational if an entered number does not match a previously stored number. Meanwhile, even if an unauthorized user's access to the apparatus is somehow denied, the unauthorized user could get access to another apparatus having no security system, and thus reproduce the program. Moreover, the labeling information itself, which appears on the outer jacket of a recording medium, may be also considered private.

SUMMARY OF THE INVENTION

Therefore, it is an object of the present invention to provide a video record/playback apparatus suitable for a video recording medium whose contents are not accessible to an unauthorized user and which can be detected using a batch method.

It is another object of the present invention to provide a method for using the video recording medium and video record/playback apparatus, that is, an accessing method or a medium detection method using the recording medium and apparatus.

To achieve the first object, there is provided a video recording medium comprising a recording portion where a program is recorded and a non-recording portion where the program is not recorded, wherein a label having bibliographic information of the program recorded on the recording portion and information to limit an access to the program is put on the non-recording portion.

To achieve the first object, there is provided a video record/playback apparatus comprising a reader for reading out information recorded on a label formed on a non-recording portion of a video recording medium which has a recording portion where a program is recorded and a non-recording portion formed with a label having bibliographic information of the program recorded on the recording portion and/or information to limit access to the program, a decoder for decoding the information read out from the reader, a character signal storing unit for storing a character signal, a controller having a memory for controlling the output of a corresponding character string from the character signal storing unit according to the output from the decoder and controlling the whole apparatus, a video display for outputting a video signal, an on-screen display (OSD) for converting the character string called from the character signal storing unit into a signal suitable for the video display, and a video record/playback unit for reproducing the program recorded on the recording portion of the video recording medium and outputting the reproduced program to the video display.

To achieve the second object, there is provided an access method, having a label on the non-recording portion of a video recording medium having a recording portion where a program is recorded, which includes bibliographic information and/or access-limiting information which is unreadable to the naked eye, comprising the steps of reading out the label, and, if the access-limiting information is not included therein, video-displaying the bibliographic information and permitting access to the recording portion of the video recording medium, or, if the access-limiting information is included therein, restricting video display of the bibliographic information and access to the recording portion of the video recording medium.

To achieve the second object, there is also provided a detection method, having a label on a non-recording portion of a video recording medium comprising a recording portion where the program is recorded, which includes bibliographic information indicating the contents of a program, for reading out the label and video-displaying the bibliographic information.

BRIEF DESCRIPTION OF THE DRAWINGS

The above objects and other advantages of the present invention will become more apparent by describing in detail a preferred embodiment of the present invention with reference to the attached drawings in which:

FIG. 1 is a plan view of a recording medium for use in a video record/playback apparatus according to the present invention;

FIG. 2 is a block diagram of the video record/playback apparatus of the present invention;

DETAILED DESCRIPTION OF THE INVENTION

Figure 3A:
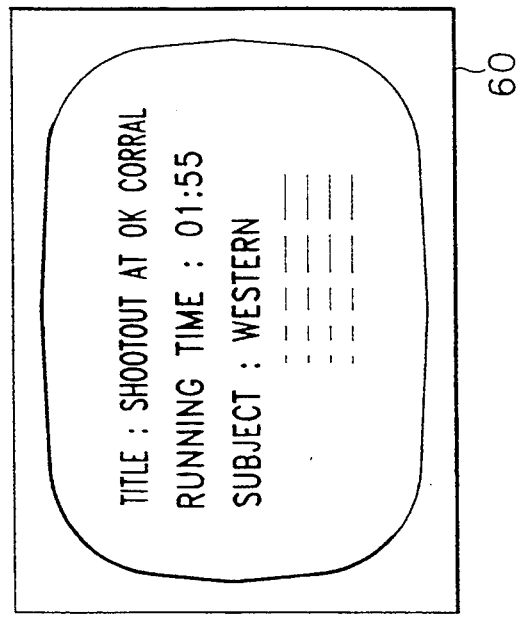
FIGS. 3A and 3B illustrate examples of information output to the video display shown in FIG. 2.

Referring to FIG. 1, a video recording medium 1 of the present invention has a recording portion 1a where a program is recorded and a non-recording portion 1b where no program is recorded. A label 2 including proper bibliographic information is printed or adhered on non-recording portion 1b. The information recorded on label 2 includes for instance, the title of a program, its running time and subject, and if necessary, even a secret number or a flag about whether or not access is permitted. Such information on label 2 is recorded in an appropriate manner corresponding to the method of a reader for a video record/playback apparatus to be mentioned later, for example, an optical reader or magnetic reading method. According to a users purposes, the information is recorded with visibly readable character information, codes which cannot be read with the naked eye together with the readable character information, or just the codes. The label illustrated in the drawings can be used for any recording medium such as video compact disk, video cassette, or floppy disk.

Referring to FIG. 2, a video record/playback apparatus comprises a reader 10 for reading out bibliographic information recorded on label 2 of video recording medium 1, a decoder 20 for decoding the information read out from reader 10, a character signal storing unit 40 for storing character signals corresponding to a character or a figure, a controller 30 for controlling the output of a corresponding character string from character signal storing unit 40 and controlling the whole system according to the output signal of the decoder 20, a video display 60 for converting an input signal into a user readable video signal as an output, and an OSD 50 for addressing and converting the character string called from character signal storing unit 40 so as to make the string suitable for video display 60.

The video record/playback apparatus further comprises a video record/playback unit 90 for reproducing the program recorded on the recording portion of video recording medium 1, an external video signal input unit 70 for inputting a broadcast signal, a cable signal, or R, G, B information from a computer, a video circuit 80 for video-processing the output of external video signal input unit 70, and an adder 100 for adding the outputs of video circuit 80 and OSD 50 and outputting the result to video display 60.

Here, it is desirable that reader 10 and decoder 20 be, for instance, an OMR reader or a magnetic reader and a corresponding decoding circuit according to the form of the information recorded on label 2 of the video recording medium 1. The reader and decoder are, for example, placed on a deck where the video recording medium is mounted. It is also desirable that controller 30 be a microcomputer having a suitable memory and that character signal storing unit 40 be, for example, a character generator. Meanwhile, OSD 50 consists of a circuit for addressing the character string which is output from character signal storing unit 40 to a location on video display 60 in a certain size and color under the control of the controller 30. It is still desirable that video display 60 is composed of a visual display such as a cathode ray tube or an LCD and its driver, external video signal input unit 70 be a tuner or a frequency converter, and video circuit 80 be an ordinary video display circuit including an amplifier and suchlike.

Figure 4:
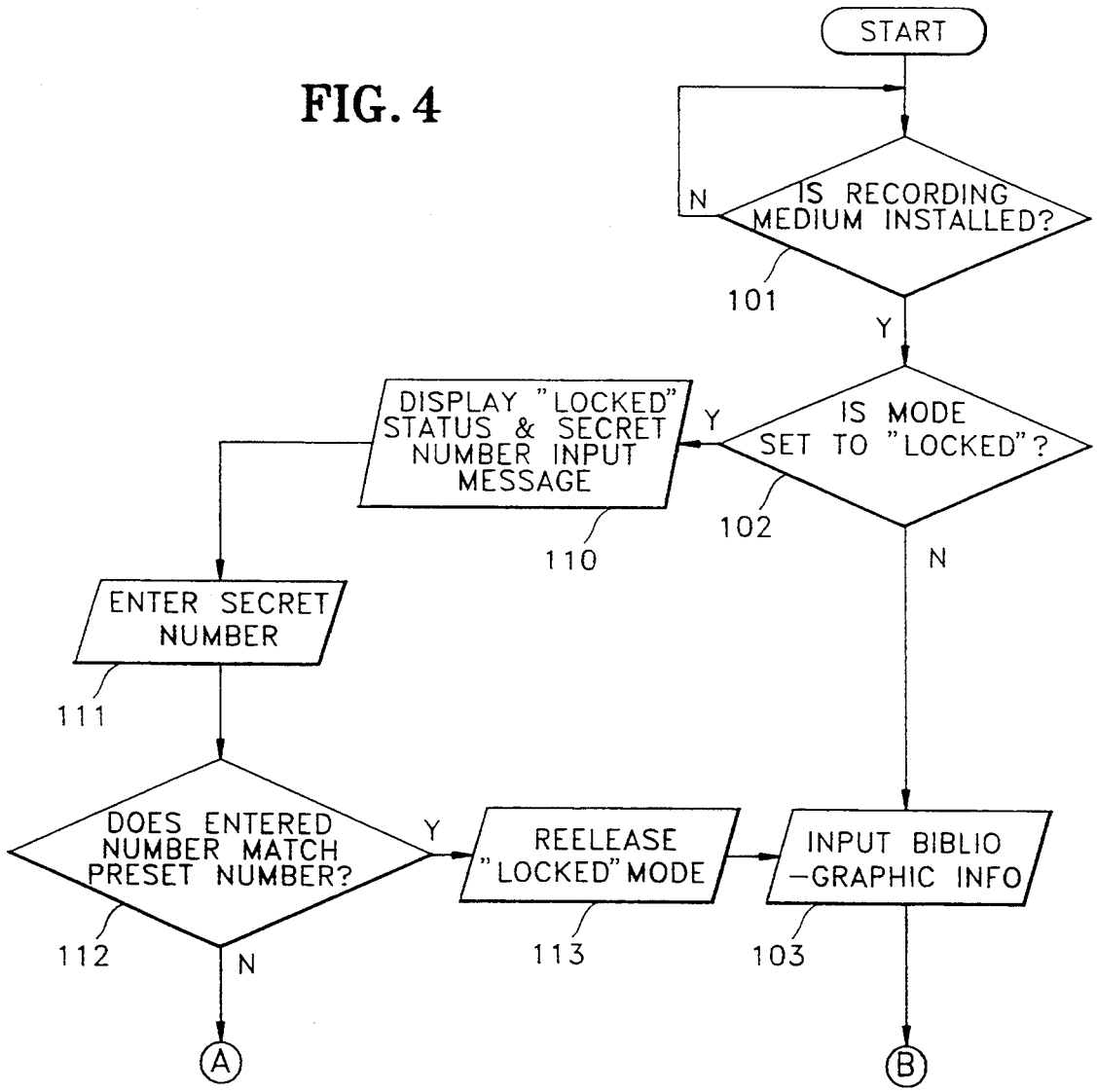
FIG. 4 is a flowchart illustrating an accessing method for the video recording apparatus of the present invention.
Figure 4:
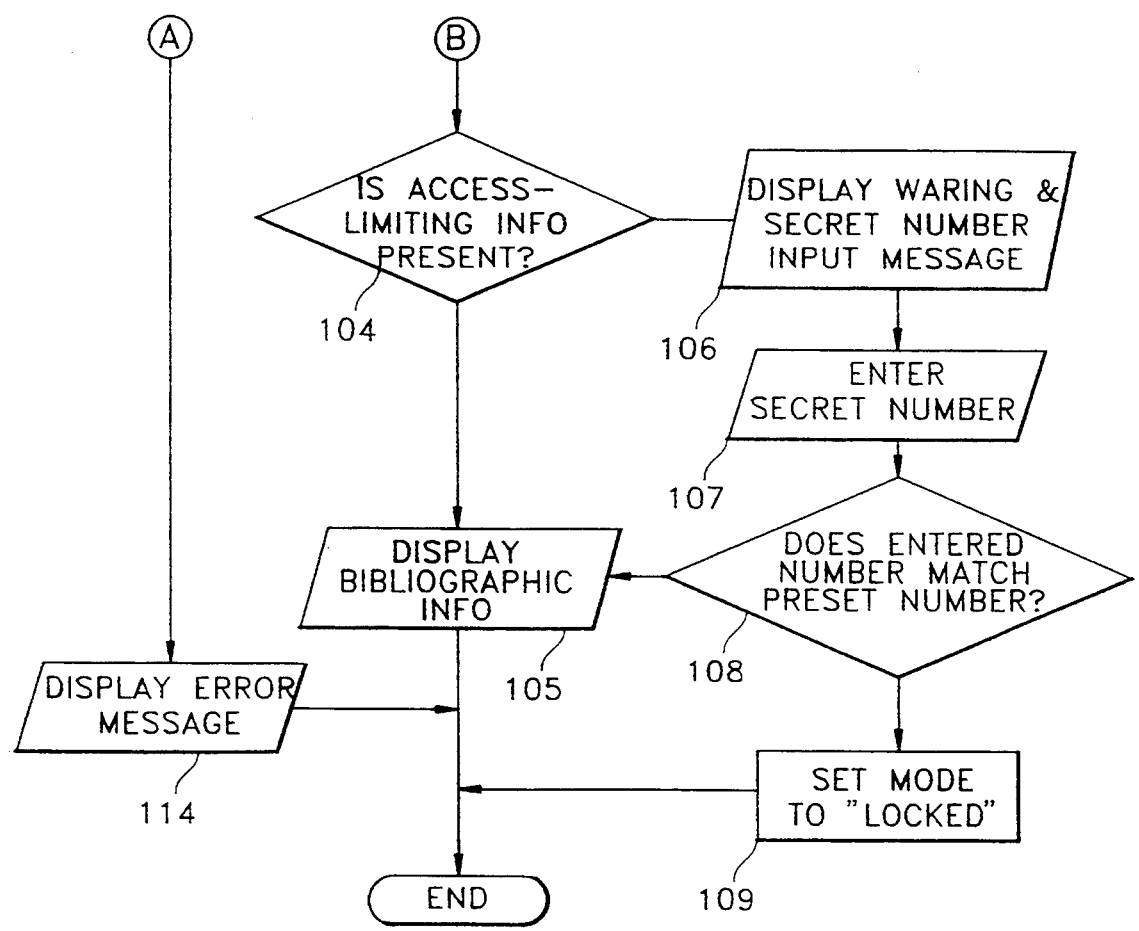

Using the video record/playback apparatus described above in detail, operation when access to the apparatus is limited will be described below with reference to FIG. 4.

When the apparatus does not operate or outputs a broadcasting signal input to external video signal input unit 70, if video recording medium 1 of the present invention is mounted on a deck, controller 30 checks whether or not video recording medium 1 is installed in a deck (step 101). Reader 10 reads out bibliographic information recorded on label 2 to output the information to decoder 20. Decoder 20 converts the information into a signal which controller 30 is able to read out and supplies the signal to controller 30.

Controller 30 decides whether or not the current mode is a locked mode (step 102). If the mode is an unlocked mode, bibliographic information supplied from decoder 20 is input (step 103). Then, controller 30 checks whether or not access-limiting information included in the input bibliographic information is present (step 104). If no access-limiting information is present, the bibliographic information is displayed (step 105). To display the information, controller 30 calls a corresponding character string from character signal storing unit 40 and outputs the string to video display 60 via OSD 50 and adder 100. If, for example, access-limiting information is not recorded on label 2, the form of displayed information is as shown in FIG. 3A wherein basic information such as the title, running time and subject is displayed in order for a user to view the contents. Here, the user can install another video recording medium on the deck and thereby detect its contents, or can convert the mode of the apparatus into a playback mode via an appropriate means such as the keypad for operating video record/playback unit 90 so that the user sees a recorded program via video display 60.

Figure 3B:
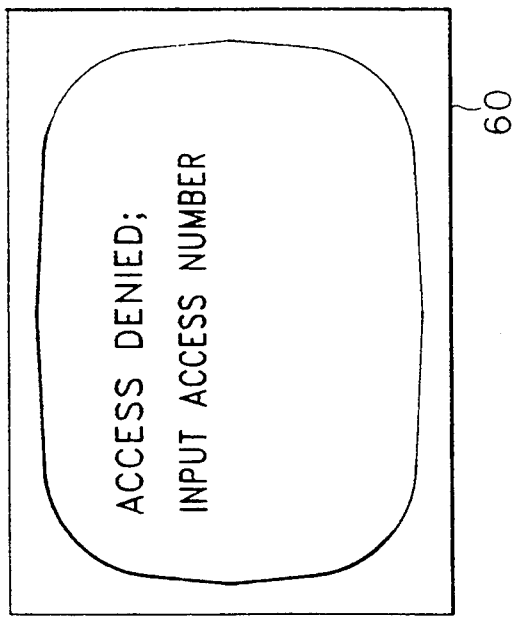

Meanwhile, if information to limit access is on label 2 of video recording medium 1, that is, a secret number or a flag is recorded in step 104, controller 30 displays for example, a warning such as "access denied" and an input instruction requesting the secret number as shown in FIG. 3B (step 106). When the secret number is correctly entered (step 107), step 108 checks whether or not the input secret number matches a preset secret number. If the numbers match, step 105 displays information such as that shown in FIG. 3A. If the input secret number does not match the secret number stored in controller 30, in order to restrict the user's access, step 109 sets the mode to the locked mode, stopping the operation of video record/playback unit 90. If the apparatus is in the locked mode in step 102, step 110 displays that fact along with the secret number input instruction. If the secret number is entered (step 111), step 112 checks whether or not the input secret number matches a preset secret number. If the numbers match, step 113 releases the locked mode to perform step 103. If the numbers do not match, step 114 displays an error message which completes the access portion of the program.

Meanwhile, since the method for detecting the contents of the video recording medium using the video record/playback apparatus of the present invention is similar to the operation of the access method, wherein access-limiting information is not recorded on label 2, the description is omitted.

The present invention is advantageous in preventing indiscreet playback of a program with sensitive contents by recording bibliographic information which is unreadable by the naked eye on a video recording medium, and requesting and detecting access to the information by means of the video record/playback apparatus of the present invention, thus preventing an unauthorized user from reproducing the contents of the program. Further, if a video record/playback apparatus capable of selectively mounting a plurality of video recording media in its deck is realized, this detection method will be quite effective.

What is claimed is:

1. A video record/playback apparatus, comprising:
    a machine reader for reading label information from a video recording medium containing a program characterized by a title, running time and subject, recorded on a recordable portion of the video recording medium, said label information being comprised of codes readable by said machine reader and recorded on a label formed on a non-recording portion of said video recording medium, said non-recording portion spaced-apart from said recordable portion, and said label information comprising bibliographic information representative of said title, running time and subject of said program recorded on said recording portion of the video recording medium and access limiting information to limit access to the program;
    a decoder for decoding the label information read from said machine reader as decoded information;
    a character signal storing unit for storing a character signal;
    a controller having a memory, for selectively permitting and denying reproduction of said program, for selectively permitting and denying display of said bibliographic information, and for controlling the output of a character string from said character signal corresponding to an alpha-numeric representation of said bibliographic information received from said character signal storing unit according to said access limiting information;
    visual display means for providing a video display corresponding to a video signal;
    an on-screen display for converting the character string received from said character signal storing unit into a display signal suitable for said video display when said controller permits display of said bibliographic information; and
    a video record/playback unit for reproducing the program recorded on said recording portion of said video recording medium and providing the reproduced program to said video display as said video signal when said controller permits reproduction of said program.

2. A video record/playback apparatus as claimed in claim 1, wherein said label is affixed to an outer surface of said video recording medium.

3. An access method for a video record/playback apparatus, said method comprising the steps of:
    using a machine reader to read a label formed on a non-recording portion of a video recording medium where a program can not be recorded, said video recording medium having a recording portion spaced-apart from said non-recording portion where a program is recorded, said label including bibliographic information comprised of codes readable by said machine reader, said bibliographic information representative of title, running time and subject of said program and access-limiting information comprised codes readable by said machine reader; and
    displaying the bibliographic information of said label and permitting reproduction of said recording portion of said video recording medium when access-limiting information is not read by said machine reader; and
    restricting the video display of the bibliographic information and reproduction of said recording portion of said video recording medium when the access-limiting information is read by said machine reader.

4. An access method as claimed in claim 3, wherein said label is affixed to an outer surface of said video recording medium.

5. A detection method of video recording media for a video/playback apparatus having a label formed on a non-recording portion of a video recording medium where a program can not be recorded, said video recording medium having a recording portion spaced-apart from said recording portion where the program is recorded, said label including bibliographic information comprised of machine readable codes indicating title, running time and subject of said program and access limiting information comprised of machine readable codes, said method comprising steps of:
    reading said label;
    determining whether said access limiting information is included on said label;
    video-displaying video images representative of the bibliographic information of said label when said access limiting information is not included on said label;
    determining whether a user of said video/playback apparatus is authorized to use said video/playback apparatus when said access limiting information is included on said label; and
    video-displaying said video images representative of the bibliographic information of said label upon determination that said user is authorized to use said video/playback apparatus.

6. A detection method as claimed in claim 5, wherein, said label is affixed to an outer surface of said video recording medium.

7. A video playback apparatus, comprising:
    means for machine reading coded label information recorded on a label formed on a non-recording portion of a video signal recording medium, said video signal recording medium having a recording portion spaced-apart from said non-recording portion, said program being recorded on said recording portion, said coded label information comprising codes readable by said reading means, said codes comprising bibliographic information representative of title, running time and subject of said program and/or access limiting information;
    means for generating decoded label information by decoding said coded label information;
    means for converting said decoded label information into on-screen display video signals;
    video playback means for selectively permitting and denying reproduction of said video program recorded on said recording portion of said video signal recording medium to generate program video signals, in accordance with said access limiting information; and
    means for selectively providing and denying said on-screen display video signals and said program video signals to a video display unit independance with said access limiting information.

8. A video playback apparatus as claimed in claim 7, wherein said video signal recording medium is a video disk, said non-recording portion is a hub portion of said video disk, and said recording portion is an annular region of said video disk concentric with and surrounding said non-recording portion.

9. A video playback apparatus as claimed in claim 7, wherein said coded label information containing said access limiting information includes a code a user must enter in order to enable said video playback apparatus to reproduce said video program.

10. A video playback apparatus as claimed in claim 8, wherein said coded label information containing said access limiting information includes a code which a user must enter in order to enable said video playback apparatus to reproduce said video program.

11. A video playback apparatus as claimed in claim 8, wherein said means for reading coded label information is an optical-magnetic reader.

12. A video playback apparatus as claimed in claim 8, wherein said means for reading coded label information is a magnetic reader.

13. A video playback apparatus as claimed in claim 8, wherein said converting means comprises:
    means for generating character strings in response to said decoded label information; and
    means for generating said on-screen display video signals by addressing said character strings for display on said video display unit.

14. A method of operation of a video playback apparatus, said method comprising:
    machine reading access-limiting information comprised of machine readable codes and bibliographic information comprised of machine readable codes representative of title, running time and subject of a program, from a label formed on a non-recording portion of a video signal recording medium when; a video program can not be recorded, for said video program recorded on a recording portion of said video signal recording medium;
    controlling a display device to display a message prompting a user to enter an access code and receiving said access code;
    determining whether said access code matches said access-limiting information;
    displaying an error message if said access code does not match said access-limiting information; and
    displaying said bibliographic information and reproducing said video program with a video playback unit if said access code matches said access-limiting information.

15. A method as claimed in claim 14, further comprising:
    before reading said bibliographic information, determining whether said video playback apparatus is in a locked condition;
    controlling a display device to display a message prompting a user to enter an unlocking code and receiving said unlocking code;
    determining whether said unlocking code matches a stored code; and
    blocking reading of said bibliographic information if said unlocking code does not match said stored code.

16. A method as claimed in claim 14, wherein said video signal recording medium is a video disk, said non-recording portion is a hub portion of said video disk, and said recording portion is an annular region of said video disk concentric with and surrounding said non-recording portion.

17. A method of operation of a video playback apparatus, said method comprising:
    determining whether said video playback apparatus is in a locked condition;
    controlling a display device of said video playback apparatus to display a message prompting a user to enter an unlocking code and receiving said unlocking code when said video playback apparatus is in said locked condition;
    determining whether said unlocking code matches a stored code;
    blocking reading of bibliographic information comprised of machine readable codes representative of title, running time and subject of a program, from a label formed on a non-recording portion of a video signal recording medium where a video program can not be recorded, for said video program recorded on a recording portion of said video signal recording medium when said unlocking code does not match said stored code;
    disabling said locked condition of said video playback apparatus when said unlocking code does match said stored code;
    machine reading access-limiting information comprised of machine readable codes and said bibliographic information;
    controlling said display device to display a message prompting a user to enter an access code and receiving said access code;
    determining whether said access code matches said access-limiting information;
    displaying an error message when said access code does not match said access-limiting information; and
    displaying said bibliographic information and reproducing said video program with a video playback unit when said access code matches said access-limiting information.

* * * * *